United States Patent
Kadota

(10) Patent No.: US 8,098,385 B2
(45) Date of Patent: Jan. 17, 2012

(54) SPOOL FILE MODIFYING DEVICE

(75) Inventor: Masatoshi Kadota, Takahama (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 1139 days.

(21) Appl. No.: 10/376,032

(22) Filed: Feb. 27, 2003

(65) Prior Publication Data

US 2003/0160991 A1 Aug. 28, 2003

(30) Foreign Application Priority Data

Feb. 27, 2002 (JP) ................................. 2002-051648

(51) Int. Cl.
*G06F 3/12* (2006.01)
(52) U.S. Cl. ...................... 358/1.13; 358/1.15; 358/3.08
(58) Field of Classification Search .................. 358/1.13, 358/1.15, 3.08
See application file for complete search history.

(56) References Cited

U.S. PATENT DOCUMENTS

| | | | | |
|---|---|---|---|---|
| 5,751,433 A | * | 5/1998 | Narendranath et al. | 358/1.9 |
| 6,002,811 A | * | 12/1999 | Koshimizu et al. | 382/298 |
| 6,313,920 B1 | * | 11/2001 | Dresevic et al. | 358/1.11 |
| 6,334,721 B1 | | 1/2002 | Horigane | |
| 6,433,882 B1 | * | 8/2002 | Mori et al. | 358/1.13 |
| 6,894,804 B2 | * | 5/2005 | Nguyen et al. | 358/1.2 |
| 6,919,967 B1 | * | 7/2005 | Pentecost et al. | 358/1.15 |
| 6,967,730 B2 | * | 11/2005 | Tomita | 358/1.13 |
| 6,975,416 B2 | * | 12/2005 | Tomita | 358/1.13 |
| 6,995,873 B1 | * | 2/2006 | Mitchell et al. | 358/3.04 |
| 7,038,707 B2 | * | 5/2006 | Shimizu | 347/253 |
| 7,050,194 B1 | * | 5/2006 | Someno et al. | 358/1.9 |
| 7,308,155 B2 | * | 12/2007 | Terada | 382/284 |
| 2002/0051169 A1 | * | 5/2002 | Nishikawa | 358/1.15 |
| 2002/0054312 A1 | * | 5/2002 | Tomita | 358/1.13 |
| 2002/0089683 A1 | * | 7/2002 | Moro et al. | 358/1.13 |
| 2003/0038964 A1 | * | 2/2003 | Ferlitsch | 358/1.15 |
| 2003/0053102 A1 | * | 3/2003 | Kelsey | 358/1.13 |
| 2003/0076519 A1 | | 4/2003 | Kadota | |

FOREIGN PATENT DOCUMENTS

| | | |
|---|---|---|
| JP | 10-240476 | 9/1998 |
| JP | 11-219265 | 8/1999 |
| JP | 2000-222145 | 8/2000 |

\* cited by examiner

*Primary Examiner* — James A Thompson
*Assistant Examiner* — Benjamin O Dulaney
(74) *Attorney, Agent, or Firm* — Day Pitney LLP

(57) ABSTRACT

A spool file modifying device for a printing system which generates a spool file including intermediate files independent of a type of printer, and converts the spool file into print data suitable to a target printer. The spool file modifying device includes a spool file retrieving system that retrieves the spool file stored in a storage, a halftone mode designating system that designates an halftone mode as a processing mode to be used when the spool file including a bitmap is reduced in size. With this mode, a gradation of the original bitmap is retained after reduced. The device further includes a modifying system that modifies the retrieved spool file if the spool file retrieved by the spool file retrieving system includes modification information designating the spool file to be modified. The spool file before modified is replaced with the modified spool file, in the storage.

20 Claims, 6 Drawing Sheets

FIG.4A
FIG.4B
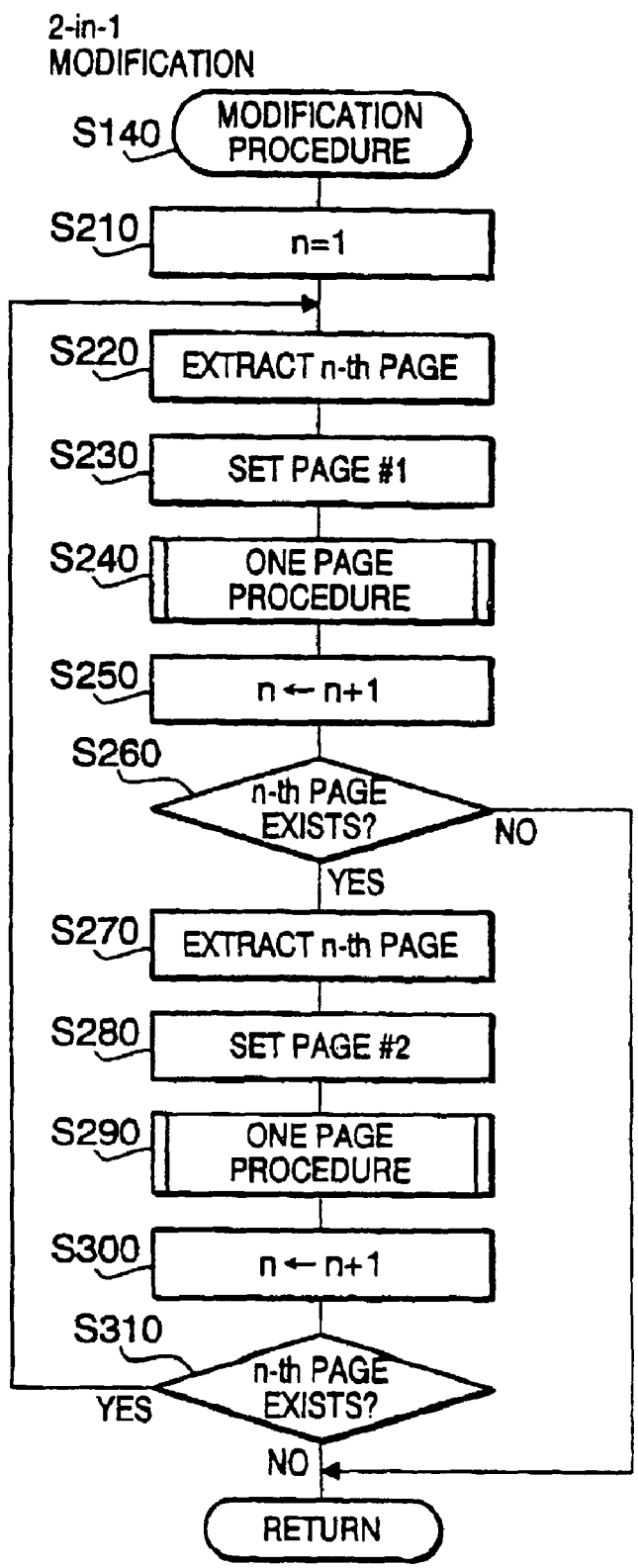
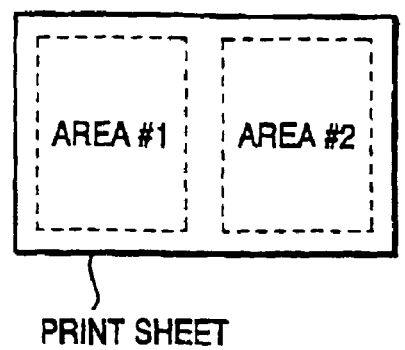
PRINT SHEET

SPOOL FILE MODIFYING DEVICE

BACKGROUND OF THE INVENTION

The present invention relates to a spool file modifying device which is used to modify a spool file for a print job to create a new spool file.

Conventionally, a printing system is employed in a computer system such as a personal computer (hereinafter occasionally referred to as PC). The printing system typically functions to generate a spool file for each print job in response to a printing instruction through application software. The spool file is temporarily stored in a storage device such as a hard disk drive (HDD). The printing system manages the print job such that, depending on an operational status of the printer, the spool file is transmitted to the printer. Generally, such a printing system is realized as a part of function of an OS (Operation System) of the computer.

FIG. 7 shows an exemplary data flow of a conventional printing system. In FIG. 7, an application program 41 is executed on the OS, for example, "Windows XP" (trademark) provided by Microsoft Corporation, and printing data (e.g., document data) created by a user using the application program 41 is output as indicated in FIG. 7.

That is, when the user operates the application program 41 to print, a print instruction is transmitted to a GDI (Graphics Device Interface) 42, which is a program module provided by the "Widows XP".

The GDI 42 generates a DC (Device Context) which is a virtual display area or a virtual device. The DC is provided for the use of the application program 41. When the DC is provided, the application program 41 performs an imaging procedure to write an image in the DC with reference to coordinates thereof, thereby an EMF (Enhanced Meta File), which is an intermediate file independent of a kind of a printer, is created for each printing page.

A plurality of intermediate files for respective pages are combined into a spool file which corresponds to one print job by a spooler system 43. Then a print processor 44 transmits the thus created spool file to another GDI (i.e., the printer driver) 45. The GDI 45 converts the received spool file into data having printer control codes suitable to a target printer.

The conversion described above by the GDI 45 is executed as a printer driver provided by a manufacturer of the printer and the OS interact. Specifically, the printer driver receives the spool file from the print processor 44, and then the printer driver calls the OS. The OS executes rasterizing of the spool file (i.e., developing of the spool file into a bitmap). The raster image (i.e., the bitmap image) is then converted by the printer driver into printer control codes.

In the meantime, recently, there is a need for performing modified print jobs. The modified print jobs include, for example, a so-called N-in-1 (e.g., 4-in-1, 2-in-1, etc.) which is a printing in a multi-page format, with which a document is printed such that a plurality of pages are reduced and incorporated within one page of printed document. Another requirement is that two different images are printed overlaid (e.g., printing of watermark). The present applicant has suggested, in Japanese Patent Provisional Publication No. HEI 11-219265, a technique for realizing such a modified printing by modifying the spool file.

According to the technique disclosed in the publication, a spool file stored by the spooler system 43 is retrieved using the print processor 44. Next, the retrieved spool file is divided into intermediate files for respective printing pages. Then, the page-divided intermediate files are processed (modified) to create a new spool file, or a modified spool file, which is returned to the spooler system 43. Then, the GDI 45 converts the modified spool file into print control codes suitable to the printer to be used for printing. Thereby, the above modified print jobs are executed.

In the conventional printing system described above, when a bitmap is included in a print job created by the application 41, a problem as follows arises. That is, if the above-described technique of modifying the spool file is applied to the spool file for the print job including the bitmap to perform the modified printing including reduction of a page, such as a multi-page format printing, depending on the application program 41 used, the gradation of the original bitmap (i.e., the bitmap before reduced) is not maintained in the reduced bitmap, and a desired printing result is not obtained.

Hereinafter, this problem will be described in detail with reference to FIGS. 8A and 8B.

In the "Windows" (trademark) system, the process of gradation upon reduction of the bitmap included in the intermediate files (i.e., EMFs) of a print job created by an application program can be previously specified in the application program.

That is, when the intermediate file for a print job including the bitmap is generated by the application program, the intermediate file (which consists of a plurality of records: see FIG. 2) includes a record indicative of a gradation processing mode when the reduction of the bitmap is executed by a program such as the printer driver other than the application program is included in In the case of "Windows", as the gradation processing mode (in "Windows", it is called as a bitmap extension/reduction mode), various modes such as black priority binarization mode (in "Windows", referred as "BLACKONWHITE" mode), white priority binarization mode (in "Windows", referred to as "WHITEONBLACK" mode), halftone mode are previously prepared. When a record indicating one of such prepared modes is added in the intermediate file, the gradation mode to be used is designated.

Specifically, when the application program designates a black priority binarizing mode for a certain bitmap, and if the spool file including the bitmap is to be reduced in accordance with the above-described spool file modifying method and then the modified spool file is to be rasterized by the OS, then the OS rasterizes the spool file in accordance with the record indicating the black priority binarizing mode.

The black priority binarizing is a method, as indicated in FIG. 8A, to combine two adjoining dots into one black dot for reduction, if at least one of the two dots is black.

Similarly, the white priority binarizing is a method to combine two adjoining dots, if at least one of which is white, into one white dot. These binarizing methods can be used, for example, in the 4-in-1 modification (i.e., modification to incorporate four pages in one page by reduction). FIG. 8B shows an example of the 4-in-1 modification employing the black priority binarizing method.

The halftone mode is a mode where the gradation of the original image is retained after the image is reduced. Various method to produce a reduced image retaining the gradation of the original image have been conventionally suggested. For example, the arrangement and the color of each dot are determined based on the arrangement and colors of the dots in the vicinity of each dot. Due to a relatively complicated computation, a processing speed of the halftone mode is generally slower than the black or white priority binarizing mode.

In the most applications, the halftone mode is selected as the gradation processing mode. Therefore, when the spool file (including a bitmap) created by such applications is to be modified to reduce an image, the OS rasterizes the spool file with retaining the gradation of the original bitmap in accordance with a halftone mode designating record included in the intermediate file. Thus, the reduced image retaining the gradation of the original bitmap can be output.

There are applications which designate the black/white priority mode as the gradation processing mode, or which does not designate any mode for processing the gradation.

In the former case, when the OS rasterized a spool file, the designated gradation processing mode is used. If, for example, the black priority mode is designated, then the processing as exemplified in FIG. 8A is performed. Therefore, as shown in the example of 4-in-1 modification shown in FIG. 8B, the reduced image does not reflect the gradation of the bitmap (i.e., the gradation of the bitmap is collapsed). It should be noted that if the halftone mode was selected, the gradation of the original image would have been retained.

In the latter case (i.e., if the processing mode is not designated), typically the Windows OS uses the black priority mode as a default mode. Therefore, when the image is processed in the latter case, the resultant image is as shown in FIG. 8B, in which the gradation of the original image is not reflected (i.e., the gradation of the bitmap is collapsed).

There are applications having a page layout function, in which the reduced image (e.g., 4-in-1 image) can be designated. In such a case, an intermediate file according to the designated page layout is created by such applications. Therefore, in such a case, the printer driver does not reduce the image created by the application and the above-described problem would not occur.

It should be stressed that the problem to be dealt with occurs when the printer driver modifies the spool file created by the applications.

SUMMARY OF THE INVENTION

The present invention is advantageous in that, when the print data including a bitmap is created by an application, and then the image represented by the print data is to be reduced with the function of a printer driver, the resultant image reflects the gradation of the original bitmap.

According to an aspect of the invention, there is provided a spool file modifying device employed in a printing system which generates a spool file for a print job and converts the spool file into print data suitable to the printer to be used, the spool file being stored in a storage, the spool file including intermediate files independent of a type of printer, the spool file modifying device converting. The spool file modifying device includes a spool file retrieving system that retrieves the spool file stored in the storage, an halftone mode designating system that designates an halftone mode as a processing mode to be used when the spool file is converted into the print data with a bitmap contained in the spool file being reduced in size, a gradation of the bitmap before reduced being retained in a bitmap as reduced when the halftone mode is designated, and a modifying system that modifies the spool file if the spool file retrieved by the spool file retrieving system includes modification information designating the spool file to be modified, the modifying system modifying the retrieved spool file and replacing the spool file before modified with the modified spool file, in the storage.

Optionally, the spool file modifying device may further include a dividing system that divides the spool file into intermediate files corresponding to print pages.

Then, the halftone mode designating system may designate the halftone mode for each of the intermediate files by adding designating data which designates the halftone mode to be used to a top of each of the intermediate files divided by the dividing system.

Alternatively or optionally, the halftone mode designating system may judge whether designating data that designates the processing mode to be used for corresponding intermediate file is included in each of the intermediate files, the halftone mode designating system replaces the designating data with predetermined designating data which designates the halftone mode as the processing mode to be used.

Optionally, the spool file modifying device may be configured to modify either a spool file for a monochromatic image or a spool file for a multi-color image, the halftone mode designating system operates only when the spool file includes data indicating that a reduced image is to be printed as the modification information and when the spool file is for printing the monochromatic image.

According to another aspect of the invention, there is provided a spool file modifying method employed in a printing system which generates a spool file for a print job and converts the spool file into print data suitable to the printer to be used, the spool file being stored in a storage, the spool file including intermediate files independent of a type of printer, the spool file modifying device. The spool file modifying method may be configured to realize the spool file modifying device described above. That is, the method may include steps of retrieving the spool file from the storage, designating an halftone mode as a processing mode to be used when the spool file is converted into the print data with a bitmap contained in the spool file being reduced in size, a gradation of the bitmap before reduced being retained in a bitmap as reduced when the halftone mode is designated, and modifying the retrieved spool file if the retrieved spool file includes modification information designating the spool file to be modified, the spool file before modified being replaced with the modified spool file, in the storage.

Optionally, the spool file modifying method may modify either a spool file for a monochromatic image or a spool file for a multi-color image.

In this case, the step of designating may designate the halftone mode for each of the intermediate files by adding designating data which designates the halftone mode to be used to a top of each of the intermediate files.

Alternatively or optionally, the step of designating may be configured to judge whether designating data that designates the processing mode to be used for corresponding intermediate file is included in each of the intermediate files, the step of designating replacing the designating data with predetermined designating data which designates the halftone mode as the processing mode to be used.

Optionally, the method may modify either a spool file for a monochromatic image or a spool file for a multi-color image, and the step of designating may operate only when the spool file includes data indicating that a reduced image is to be printed as the modification information and when the spool file is for printing the monochromatic image.

According to a further aspect of the invention, there is provided a computer accessible medium that stores programs to be executed by a computer, the programs representing a spool file modifying method or realizing the device as described above. That is, the device and method described above may be realized when appropriate programs are provided and executed by a personal computer or the like. Such programs may be stored in recording medium such as a floppy disk, CD-ROM, memory cards and the like and distributed. Alternatively or optionally, such programs can be distributed through networks such as the Internet.

BRIEF DESCRIPTION OF THE ACCOMPANYING DRAWINGS

FIG. 1 is a block diagram showing a configuration of software modules of a printing system according to an embodiment of the invention;

FIG. 2 schematically shows an exemplary structure of a spool file;

FIG. 4A is a flowchart illustrating an example of a MODIFYING PROCEDURE (i.e., 2-in-1 modification) performed in S140 of the SPOOL FILE MODIFYING PROCEDURE shown in FIG. 3;

FIG. 4B illustrates setting of printing areas for two pages of data in the same page;

DESCRIPTION OF THE EMBODIMENT

Hereinafter, a printing system according to an embodiment of the invention will be described with reference to the accompanying drawings.

Figure 1:
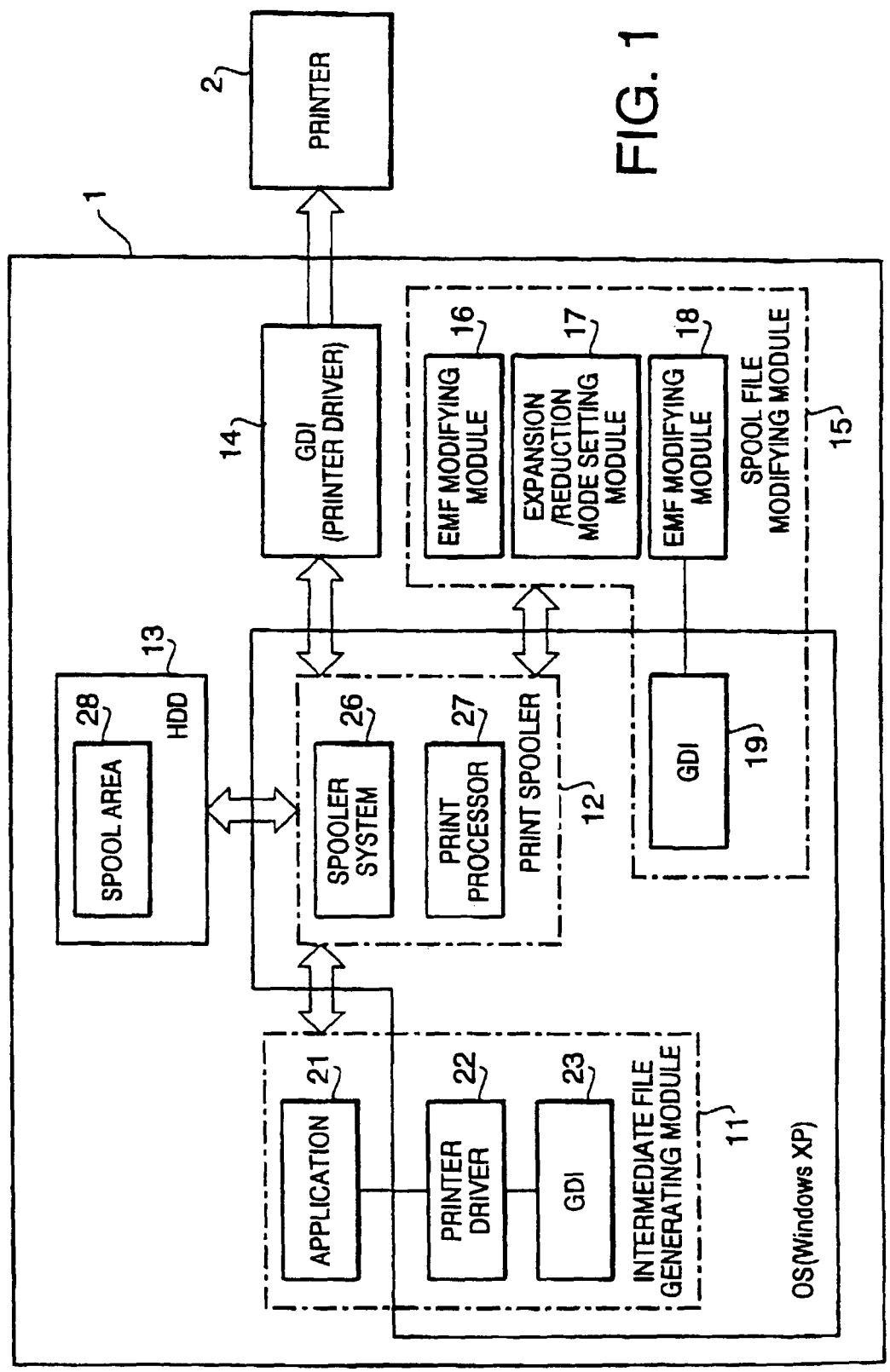

FIG. 1 is a block diagram showing a configuration of software modules of a printing system according to an embodiment of the invention. In the embodiment, a description is given in a case where an OS (operating system) of a PC (personal computer) 1 is "Windows XP" (trademark) provided by Microsoft Corporation.

When a print job is created, intermediate files, which are created by an intermediate file generating unit 11, are combined and stored temporarily as a spool file in a spool area 28 by a print spooler 12. If the stored spool file includes modification information, a spool file modifying module 15 modifies the spool file, and stores the modified spool file in the spool area 28 again (i.e., overwrites the spool file). Depending on an operating status of a printer 2, the spool file is converted into printer control codes using a GDI (Graphics Device Interface) 14, and the printer control codes are transmitted to the printer 2.

It should be noted that, the PC 1 generally includes hardware such as CPU, ROM, RAM, I/O unit and the like, which operate under control of the OS. Applications such as application programs and device drivers run under control of the OS. In particular, according to the embodiment, the printer driver 22 and the GDI 23 included in the intermediate file generating module 11, and the print spooler 12 are provided as program modules which are functions of the OS. Further, the GDI 14, a page dividing module 16, an expansion/reduction mode setting module 17 and an EMF modifying module 18 are device drivers (i.e., programs) installed in the PC 1 for controlling the printer 2 in association with the OS.

A print processor 27 is a program module which is installed in the PC 1 corresponding to the printer 2, aside from a print processor (not shown) originally implemented in the OS (i.e., Windows XP). The print processor 27 functions, in association with the spool file modifying module 15, to constitute a spool file processing device.

According to the embodiment, all the programs realizing various functions of the printing system are stored in a hard disk drive (HDD) 13.

Next, operation of the printing system will be described in detail.

As shown in FIG. 1, print data created by an application 21 running on the PC 1 is transmitted to a GDI 23, which is a program module supplied by "Windows XP" via the printer driver 22 of "Windows XP". The GDI 23 generates a DC (device context) which is a virtual display area or a virtual device. At designated coordinates of the DC, print data which is independent of types of devices (printer) is stored for each print job (i.e., images are drawn in the virtual device). The application 21 represents application programs such as a word processor, a spreadsheet which run on the OS.

Generally, there are two types of GDIs: one for managing the DC and/or creating EMFs (Enhanced Meta Files); and the other for converting the data stored in the DC to commands depending on a certain device (i.e., a target device) such as a printer or a display. The former is provided by the OS, and corresponds to the GDI 23 and a GDI 19 (which will be described later). The latter is supplied from a manufacturer of a device as a device driver, and corresponds to a GDI 14 (which will be described later). It should be noted that, in FIG. 1, the GDI 23 and the GDI 19 are shown as separate modules. However, they are provided as a single combined module having the both functions.

As described above, by drawing images on the DC, or the virtual device, EMFs (enhanced meta files, which are intermediate files) which are independent of the type of the device are generated for each page. The EMFs are combined by the print spooler system 26 into a spool file as one print job. The spool file is stored in the spool area 28 provided in the HDD 13. The spool file includes information for the modified printing such as multi-page printing, overlaid printing (watermark), replacement of pages and the like.

When a user operates the application 21 to print data which is created by the application 21, if the user designates the modified printing, data representing the modified printing (modification information for modifying the spool file) is added to the spool file.

It should be noted that the spool area 28 needs not be defined in the HDD 13 of the PC 1. As far as the spool area 28 can be managed from the PC 1, the spool area 28 may be provided at any place. For example, an external storage may be provided outside the PC 1, and the spool area 28 is defined in the external storage.

When the modified printing such as the multi-page printing and/or overlaid printing is performed, the spool file modifying module 15 is executed, thereby spool files for respective print jobs, which are stored in the spool area 28, are modified for the modified printing. Specifically, the print processor 27 retrieves a spool file stored in the spool area 28, and judges wither the retrieved spool file includes the modification information. If the retrieved spool file includes the modification information, it is transferred to the spool file modifying module 15.

The printer 2 according to the embodiment is a color page printer, which is capable of printing not only a black and white image (or a monochromatic image) but also a multi-color image. Accordingly, the spool file modifying module 15 is configured such as to modify not only the spool files for black and white images but also the spool files for color images based on the modifying data.

The modification performed by the spool file modifying module 15 will be described schematically.

Firstly, the page dividing module 16 divides the spool file transferred from the print processor 27 into the EMFs (intermediate files) provided for respective pages. Then, a copy of each EMF is stored as a temporary file in the HDD 13. The temporary file will be deleted when it becomes unnecessary. It should be noted that, before the spool file is divided into EMFs, the spool file modifying module 15 obtains the modification information from the spool file and identifies the modification to be performed.

Figure 2:
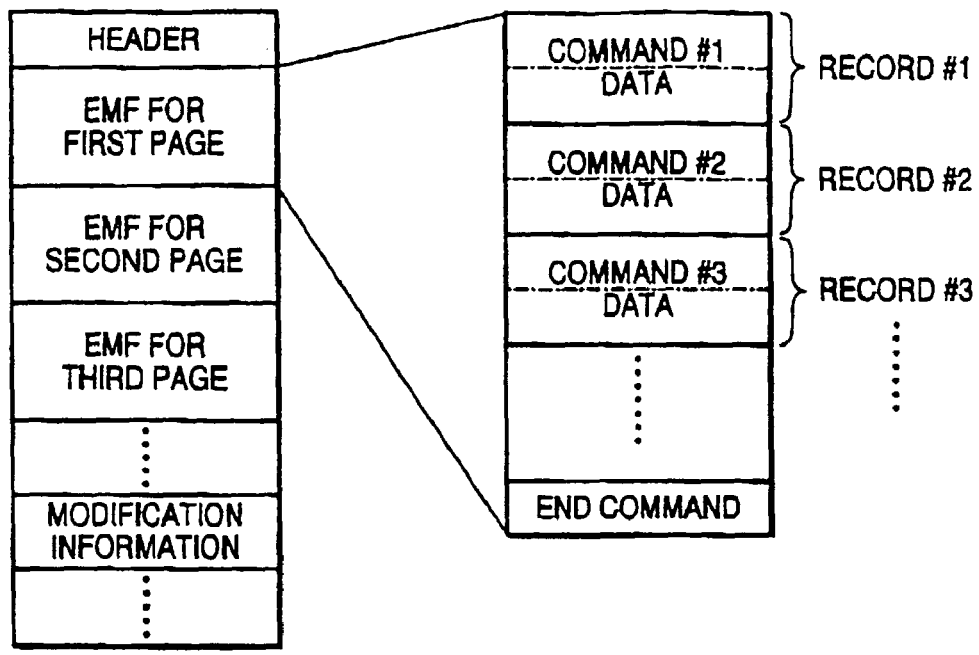

FIG. 2 schematically shows a structure of the spool file. The spool file includes a header, followed by the EMFs for respective pages. Although not shown in FIG. 2, at the top of each page, a header for each page, which is different from the header of the spool file, is provided. The EMF for each page includes a plurality of records including a plurality of sets of a command and data, followed by an end command.

In the embodiment, the modification information is included in the spool file. It is only an exemplary embodiment, and the invention is not limited to this configuration. It should be noted that, such modification information is generally obtained using a sub-routine (i.e., API: Application Programming Interface) provided as a function of the OS.

Next, the EMF modifying module 18 applies modifications to the EMF of each page in accordance with the modification information and generates a new spool file including the new EMF.

The spool file modified by the spool file modifying module 15 and stored at the spool area 28 is transmitted to the GDI 14 by the print processor 27. Then, by the GDI 14, the new EMFs are converted into printer control codes suitable to the printer 2, and transmitted to the printer 2 as the print data.

It should be noted that different manufactures generally have different specifications of the printer control commands. That is, known various command sets are defined by PDL (Page-Description Language) such as "PCL (Printer Control Language)" of Hewlett Packard, and "PostScript" (registered trademark) of Adobe System Incorporated. The GDI 14 converts the spool file consisting of EMFs for respective pages into the printer control codes in accordance with the PDL employed in the printer 2.

As described above, the EMF for each page includes a plurality of records (see FIG. 2). The plurality of records include a bitmap expansion/reduction designation record indicative of an expansion/reduction mode of a bitmap to be used for expanding and/or reducing a bitmap.

The conversion of the spool file to the printer control codes by the GDI 14 is performed in association with the OS (which is "Windows XP" in the embodiment). As the GDI 14, which receives the spool file from the print processor 27, calls the OS, and rasterizing of the spool file is executed by the OS. A raster image, which is an image rasterized by the OS, is converted into the printer control codes by the GDI 14.

The rasterizing operation is performed such that the EMFs for respective pages are analyzed in order (e.g., in order from records #1, #2, . . . in the example of FIG. 2). When the expansion/reduction of a bitmap is performed during the rasterizing, if an expansion/reduction mode is designated in the bitmap expansion/reduction record, the expansion/reduction of the bitmap is executed in accordance with the designated expansion/reduction mode.

According to the present embodiment, as the expansion/reduction mode, the black priority mode, the white priority mode and the halftone mode are available. Designation of the mode (i.e., setting of the bitmap expansion/reduction designation record) is executed when the application 21 creates the EMFs. Thus, designation of the mode depends on the application 21.

In each EMF generated by the application 21, if, for example, a record #1 (FIG. 2) is a bitmap expansion/reduction designation record in which the halftone mode is designated, and record #2 or subsequent records include a bitmap and modifying information including reduction of the bitmap (e.g., multi-page printing), the reduction of the bitmap is performed so that the gradation of the original bitmap is retained.

If record #3 is the bitmap expansion/reduction designation record for which the black priority mode is designated, then a bitmap included in record #3 or later is reduced in accordance with the black priority mode. Therefore, in such a case, the gradation of the original bitmap image is not retained (the gradation of the printout is collapsed).

The expansion/reduction mode to be designated depends on the application 21. Generally, the halftone mode is designated. However, there are applications which designate the black priority mode, or do not designate an expansion/reduction mode (i.e., no bitmap expansion/reduction designation record is added). In such a case, if the bitmap reduction procedure is performed, as described above, the gradation of the original bitmap image cannot be retained in the reduced bitmap image.

According to the embodiment, during the modifying procedure executed by the spool file modifying module 15, an expansion/reduction mode setting module 17 designates the expansion/reduction mode as the halftone mode, which will be described in detail later. It should be noted that when the spool file before modified represents a non-halftone image (i.e., a black-and-white image), the modified spool file does not represent the image having gradation. Even in such a case, however, it is considered that the expansion/reduction is executed with the halftone mode.

Figure 3:
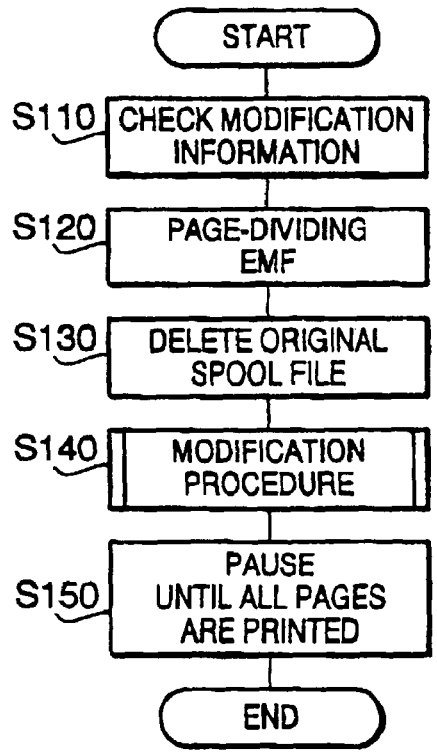
FIG. 3 is a flowchart illustrating a SPOOL FILE MODIFYING PROCEDURE according to an embodiment of the invention.

According to the printing system configured as described above, when the print processor 27 of the PC 1 judges that the spool file includes the modification information, and the spool file is transferred to the spool file modifying module 15, a spool file modifying procedure is executed by the spool file modifying module 15. FIG. 3 is a flowchart of a SPOOL FILE MODIFYING PROCEDURE, which is provided as a program module and executed by the PC 1.

When the SPOOL FILE MODIFYING PROCEDURE is initiated, in S110, the modification information included in the spool file is checked, and how to modify the spool file is determined. In S120, the spool file is divided into EMFs for respective pages. In S130, an original print job (i.e., the spool file) stored in the spool area 28 is deleted, and control proceeds to S140, where a MODYFICATION PROCEDURE is executed.

In S140, in accordance with the modification information checked in S110, the page-divided EMFs are processed (modified) and then saved as a new print job. After the spool file is modified, control pauses until all the pages are printed (S150).

When the printing is finished, the SPOOL FILE MODIFICATION PROCEDURE is terminated.

Next, the MODIFICATION PROCEDURE executed in S140 will be described in detail. In S140, as aforementioned, a procedure in accordance with the modification information included in the spool file is performed. The modification information may include execution of multi-page printing (i.e., printing with a plurality of successive pages incorporated in one page), overlaid printing (i.e., printing with semi-transparent characters overlaid on another image, which is also known as watermark printing), page-exchange printing (i.e., printing with pages exchanged), and the like.

Taking the multi-page printing (e.g., 2-in-1 printing) as an example, the MODIFICATION PROCEDURE will be described.

FIG. 4A is a flowchart illustrating the MODIFICATION PROCEDURE when the modification information indicates the 2-in-1 printing, which is a printing with two reduced pages in one page.

When the procedure shown in FIG. 4A starts, in S210, a variable n indicating the number of EMF page to be processed is set to one. Then, in S220, an EMF for page n (initially, page one) is extracted. In S230, a printing area #1 as shown in FIG. 4B is defined. That is, data corresponding to one entire page if the modification is not done is assigned to be formed in a left-hand side half of a page as the 2-in-1 modification is applied. Then, in S240, a ONE PAGE PROCEDURE is performed. The ONE PAGE PROCEDURE generates a new, modified spool file (EMF for each page) for 2-in-1 printing as the page-divided EMF is assigned to a predetermined DC.

After the ONE PAGE PROCEDURE in S240 is performed, in S250, the variable n is incremented by one (i.e., n is set to two when this step is executed firstly), and control proceeds to S260, where it is judged whether an EMF for page n (i.e., second page) exists. If the EMF for the n-th page does not exist, the MODIFICATION PROCEDURE is terminated. If the EMF for the n-th page exists, steps S270 through S300, which are similar to S220 through S250, are executed.

That is, the EMF for the n-th page is extracted (S270), and a printing area #2 is defined (S280) as shown in FIG. 4B. Thus, the data of the n-th page is assigned to be printed on the right-hand side of a page by the 2-in-1 modification. Then, the ONE PAGE PROCEDURE is performed as to the EMF for the n-th page (S290), and the variable n is further incremented by one (n is set to three) in S300.

In S310, as in S260, it is judged whether the EMF for the n-th page (i.e., the third page when this step is executed first time) exists. If the EMF does not exist, the MODIFICATION PROCEDURE is terminated. If the EMF exists, the steps S220 and thereafter are performed for the EMF for the n-th page.

As above, the procedures in S220 through S240 modify the printing data such that the EMFs for odd number pages are printed on the left-hand side (area #1) of the pages, and the procedures in S270 through S290 modify the printing data such that the EMFs for even number pages are printed on the right-hand side (area #2) of the pages. As a result of the above procedures, two pages of printing data can be printed on a single page.

Figure 5:
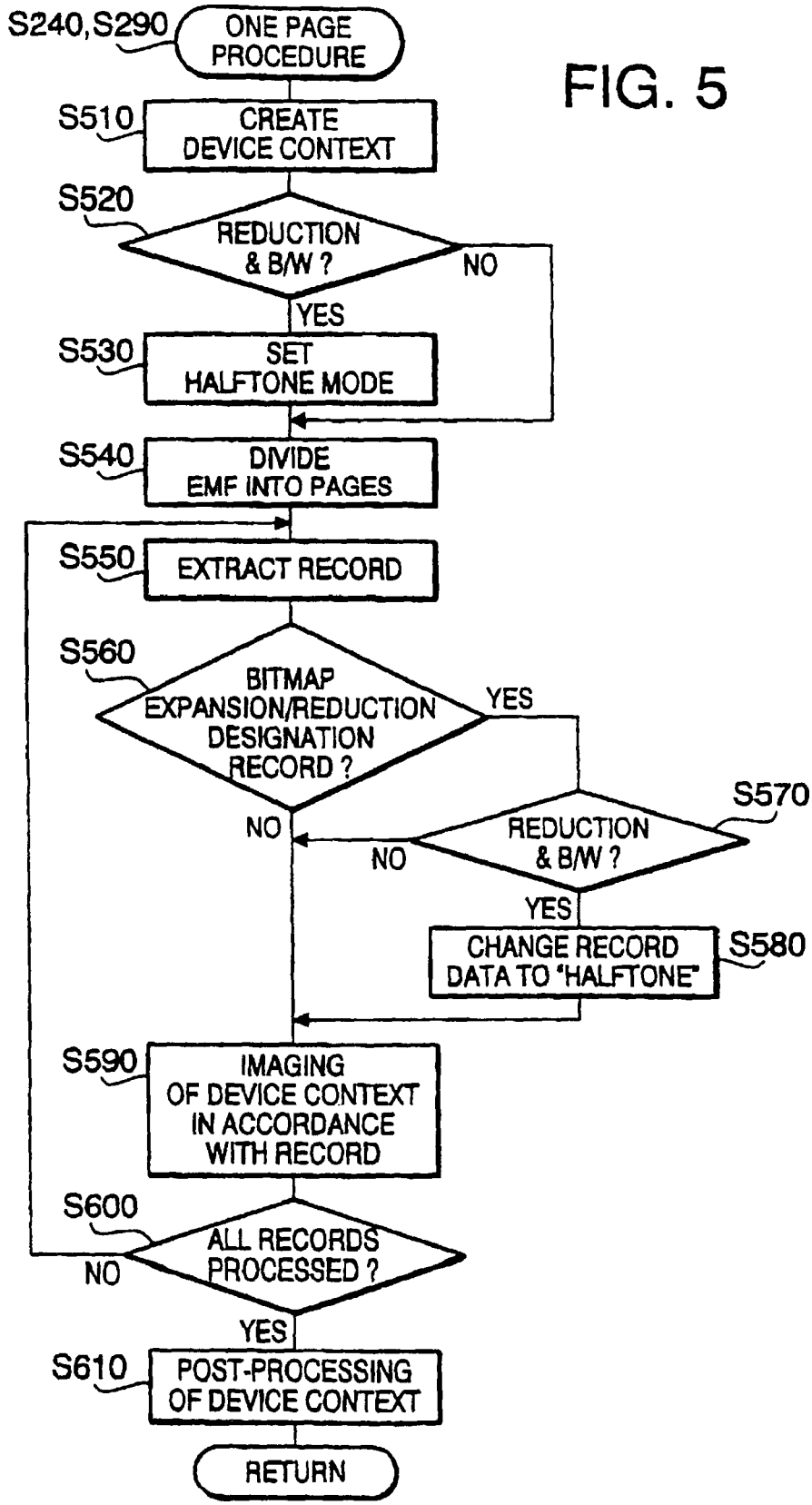
FIG. 5 is a flowchart illustrating a ONE PAGE PROCEDURE called in the procedure illustrated in FIG. 4A.

Next, the ONE PAGE PROCEDURE called in S240 and S290 of the MODIFICATION PROCEDURE shown in FIG. 4A will be described in detail with reference to FIG. 5. It should be noted that the ONE PAGE PROCEDURE shown in FIG. 5 is not only performed in the modification for the multi-page printing such as the 2-in-1 printing, but also called for other modification procedure when necessary.

When the ONE PAGE PROCEDURE is initiated, in S510, the DC is generated by calling the GDI 19, which is a function of the OS. Coordinates of the DC are defined such that the printing area #1 (odd page) or the printing area #2 (even page) is an image forming area thereof. Then, in S520, it is judged whether the currently processed spool file includes the modification information indicative of the reducing modification such as the multi-page printing, and whether the spool file is for the black-and-white printing. If the spool file does not include the modification information indicative of the reducing modification and it is not for the black-and-white printing, control skips S530 and proceeds to S540. If the spool file includes the modification information indicative of the reducing modification and the spool file is for the black-and-white printing, control proceeds to S530, where the expansion/reduction mode for the EMF is set to the halftone (intermediate tone) mode.

Specifically, at the top of the EMF for the currently processed page, the bitmap expansion/reduction designation record designating the halftone mode as the expansion/reduction mode for the bitmap is added. In the example shown in FIG. 2, the bitmap expansion/reduction designation record is newly added before record #1. Thus, if a bitmap is included in record #1 or later, the reducing operation is performed with retaining the gradation of the original bitmap.

However, as aforementioned, even if the halftone mode is designated at the top of the EMF, if the EMF includes another bitmap expansion/reduction designation record indicative of the mode other than the halftone mode in the middle, the bitmap of the record or the later is reduced in accordance with the mode designated by the later expansion/reduction mode.

Therefore, according to the present embodiment, as shown in FIG. 5, after the halftone mode is designated in S530, the EMF is divided for each record in S540, and the divided records are extracted in order (from record #1 in FIG. 2) in S550.

In S560, it is judged whether the extracted record is the bitmap expansion/reduction designation record. If the record is not the bitmap expansion/reduction designation record, control proceeds to S590, and image formation on the DC is executed in accordance with the contents of the record. If the extracted record is the bitmap expansion/reduction designation record, control proceeds to S570. In S570, as in S520, it is judged whether the currently processed spool file includes the modification information indicative of the reducing modification such as the multi-page printing, and whether the spool file is for the black-and-white printing.

If the spool file does not include the modification information indicative of the reducing modification or it is not for the black-and-white printing, control proceeds to S590. If the spool file includes the modification information indicative of the reducing modification and the spool file is for the black-and-white printing, control proceeds to S580, where the expansion/reduction mode for the EMF is changed to the halftone (intermediate tone) mode.

In S600, it is judged whether the procedure (S550 though S590) has been executed for all the records. If the procedure has been executed for all the records, control proceeds to S610 and a post-processing of DC is executed. That is, the DC is closed and completion of modification for one page is informed to the spooler system 26. With this procedure, the non-modified EMF is replaced with the EMF which has been modified. Then the modified EMF is transmitted to the printer 2 depending on the operation status of the printer 2. As understood from the above, even if the modification has not been performed for the EMFs of all the pages, printing can be performed in order in which the EMFs have been modified.

If the decision in S600 is negative (there are non-processed records remained), control returns to S550, and the procedure as described above is performed. With this operation, all the records constituting the EMF are finally processed (S550 through S590 are performed). As a result, at the top of the EMF, the bitmap expansion/reduction designation record designating the halftone mode is added, and all the bitmap expansion/reduction designation records originally included in the EMF are modified to designate the halftone mode.

As described above, according to the printing system, when the spool files generated by the application 21 are modified by the spool file modifying module 15, if the spool files include modification information designating the reduction modification and the spool files are for black-and-white printing, the expansion/reduction mode for the spool files are changed to the halftone mode. That is, at the top of each EMF, the bitmap expansion/reduction designation record designating the halftone mode is added, and further the bitmap expansion/reduction designation records originally included in the EMF are changed to records designating the halftone mode.

With this modification, when the spool files are converted into printer control codes by the GDI 14, and the reduction of the bitmap is performed, the gradation in the original bitmap is retained in the reduced bitmap.

Further, according to the embodiment, the modification to designate the halftone mode is not applied to all the spool files. Only when the reduction results in collapse of the gradation of the bitmap (i.e., the reduction of the bitmap is designated and the spool file is for the black-and-white printing), the halftone mode is designated. Therefore, conversion from the spool file to the printer control codes can be performed efficiently and at a high speed.

The above-described embodiment is an exemplary embodiment, and various modifications can be realized without departing from the gist of the invention.

For example, in the embodiment, the procedure for executing the 2-in-1 printing is described. However, the invention can be applied to the multi-page printing other than the 2-in-1 printing.

Further, the invention can be applied in a case other than the multi-page printing. For example, when a print job, generated by the application 21, is modified such that an image corresponding to a certain size of a sheet is reduced so as to be printed on a smaller size sheet, the bitmap expansion/reduction designation records designating the halftone printing can be added/substituted.

Figure 6:
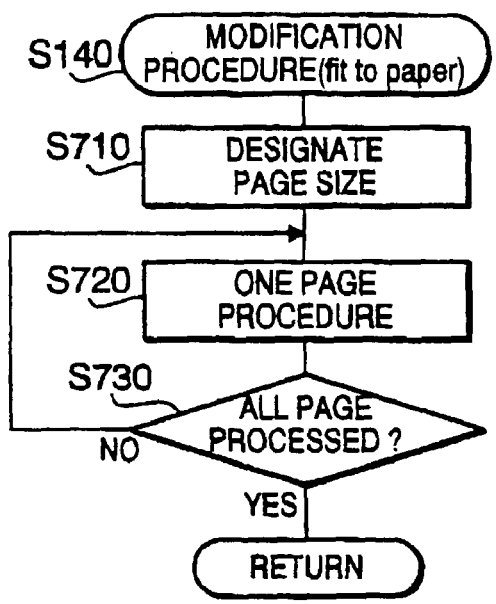
FIG. 6 is a flowchart illustrating another example of the MODIFYING PROCEDURE performed in the SPOOL FILE MODIFYING PROCEDURE shown in FIG. 3
Figure 7:
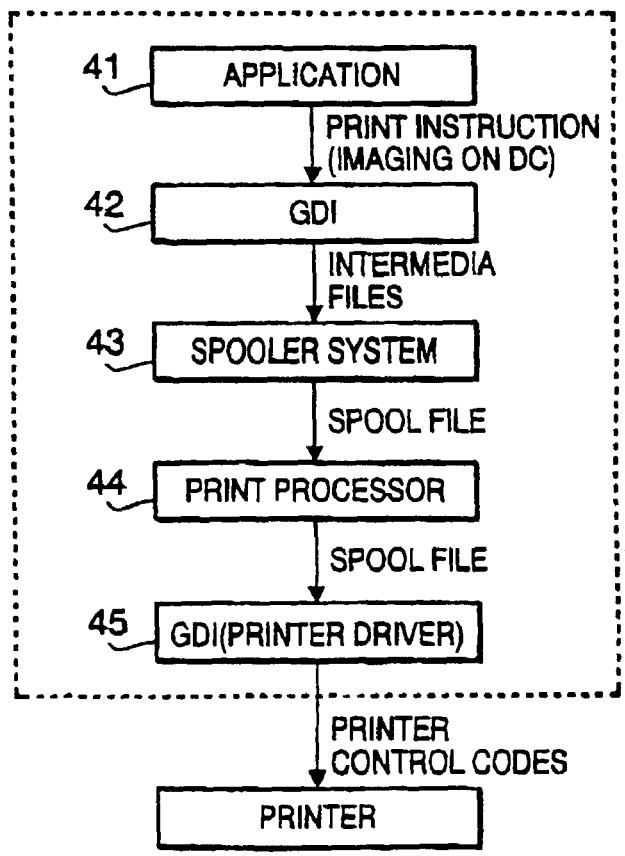
FIG. 7 is a chart showing a data flow in a conventional printing system.
Figure 8A:
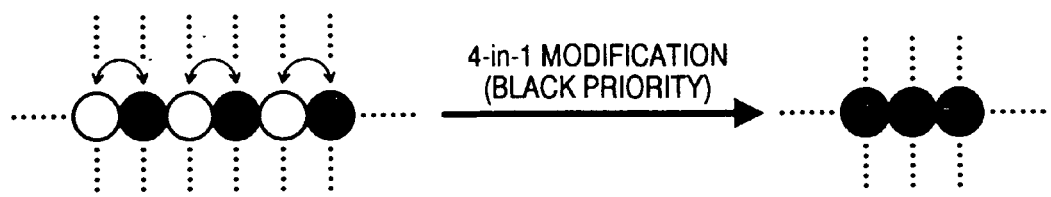
FIG. 8A illustrates a black priority binarizing method.
Figure 8B:
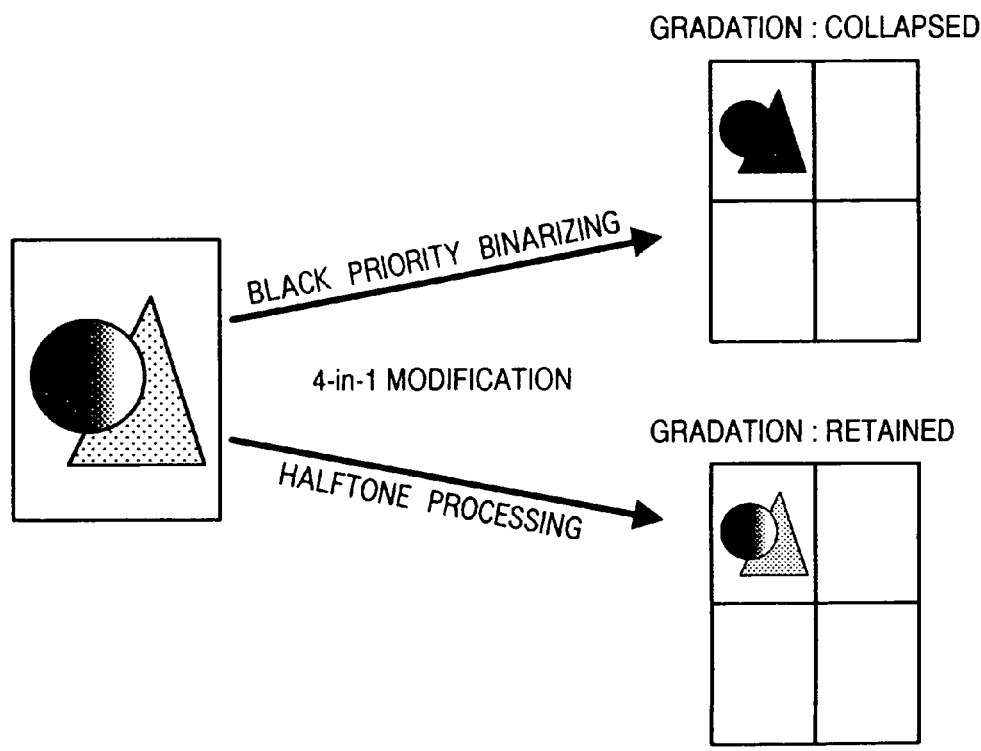
FIG. 8B illustrates a difference between the printouts based on different gradation processing methods when an image is reduced, respectively.

FIG. 6 is a flowchart illustrating a case where the spool file is modified so that the image fits to a recording sheet.

In this procedure, in S710, the size of the sheet is designated. The designation of the size of the sheet is performed based on sheet size information (which is information indicating the size of sheet to be used when printed) included in the modification information.

Once the sheet size is designated, in S720, the ONE PAGE PROCEDURE corresponding to the designated sheet size is executed. The ONE PAGE PROCEDURE is similar to that shown in FIG. 5. After the ONE PAGE PROCEDURE is executed for all the pages of the EMFs (S730: YES), the procedure is terminated.

As described above, the spool file modifying system can be applied to all the modification including the page reduction, and when applied, the gradation of the original images can be retained in the reduced images.

In the above-described embodiment, the programs that realize the functions of the spool file modifying device (e.g., the functions of the spool file modifying module 15, the print processor 27 and the like) are stored in the HDD 13. However, the programs may be stored in any other medium such as a floppy disk, magneto-optical disk, CD-ROM, ROM, non-volatile memory and the like which are accessible by a computer. By loading the necessary programs from such a medium into the computer system, the spool file modifying device can be realized on the computer. It should be noted that such programs can be distributed through networks such as the Internet, and installed in a computer to realize the printing system.

The present disclosure relates to the subject matter contained in Japanese Patent Application No. 2002-051648, filed on Feb. 27, 2002, which is expressly incorporated herein by reference in its entirety.

What is claimed is:

1. A spool file modifying device employed in a printing system which generates a spool file for a print job and converts the spool file into print data suitable to a printer to be used, the spool file being stored in a storage, the spool file including intermediate files independent of a type of the printer, said spool file modifying device comprising:
   a spool file retrieving system that retrieves the spool file stored in the storage;
   a halftone mode designating system that judges whether the retrieved spool file includes data indicating that an image is to be printed in a reduced area of a print sheet or not, and if the retrieved spool file does not include halftone mode information, (a) designates a halftone mode as a processing mode to be used when judged that the spool file includes the data indicating that an image is to be printed in a reduced area of a print sheet, and (b) does not designate the halftone mode as the processing mode to be used when judged that the spool file does not include the data indicating that the image is to be printed in the reduced area of the print sheet; and
   a modifying system that:
   modifies the spool file not including the halftone mode information into a modified spool file including the halftone mode information when the halftone mode designating system judges that the spool file includes data indicating that an image is to be printed in a reduced area of a print sheet and designates the halftone mode; and
   maintains the spool file not including the halftone mode information when the halftone mode designating system judges that the spool file does not include data indicating that an image is to be printed in a reduced area of a print sheet and the halftone mode designating system does not designate the halftone mode,
   said modifying system replacing the unmodified spool file with the modified spool file, in the storage, when the spool file is modified; and
   a converting system that converts the spool file into the print data irrespective of whether the spool file is modified by the modifying system or not.

2. The spool file modifying device according to claim 1, which is capable of modifying either a spool file for a monochromatic image or a spool file for a multi-color image, said halftone mode designating system operates only when said spool file is for printing the monochromatic image.

3. The spool file modifying device according to claim 1, further including a dividing system that divides the spool file into intermediate files corresponding to print pages, wherein said halftone mode designating system designates the halftone mode for each of the intermediate files by adding designating data which designates the halftone mode to be used to a top of each of the intermediate files divided by said dividing system.

4. The spool file modifying device according to claim 3, which is capable of modifying either a spool file for a monochromatic image or a spool file for a multi-color image, said halftone mode designating system operates only when said spool file is for printing the monochromatic image.

5. The spool file modifying device according to claim 1, further including a dividing system that divides the spool file into intermediate files corresponding to print pages, wherein said halftone mode designating system judges whether designating data that designates the processing mode to be used for corresponding intermediate file is included in each of the intermediate files, said halftone mode designating system replaces the designating data with predetermined designating data which designates the halftone mode as the processing mode to be used.

6. The spool file modifying device according to claim 5, which is capable of modifying either a spool file for a monochromatic image or a spool file for a multi-color image, said halftone mode designating system operates only when said spool file is for printing the monochromatic image.

7. The spool file modifying device according to claim 1, further including a dividing system that divides the spool file into intermediate files corresponding to print pages,
wherein said halftone mode designating system designates the halftone mode for each of the intermediate files by adding designating data which designates the halftone mode to be used to a top of each of the intermediate files divided by said dividing system, said halftone mode designating system further judging whether designating data that designates the processing mode to be used for corresponding intermediate file is included in each of the intermediate files, said halftone mode designating system replaces the designating data with predetermined designating data which designates the halftone mode as the processing mode to be used.

8. The spool file modifying device according to claim 7, which is capable of modifying either a spool file for a monochromatic image or a spool file for a multi-color image, said halftone mode designating system operates only when said spool file is for printing the monochromatic image.

9. A spool file modifying method employed in a printing system which generates a spool file for a print job and converts the spool file into print data suitable to a printer to be used, the spool file being stored in a storage, the spool file including intermediate files independent of a type of the printer, the spool file modifying method comprising steps of:
retrieving the spool file from the storage;
judging whether the retrieved spool file includes data indicating that an image is to be printed in a reduced area of a print sheet or not;
if the retrieved spool file does not include halftone mode information, (a) designating a halftone mode as a processing mode to be used when judged that the spool file includes the data indicating that an image is to be printed in a reduced area of a print sheet, and (b) not designating the halftone mode as the processing mode to be used when judged that the spool file does not include the data indicating that the image is to be printed in the reduced area of the print sheet;
modifying the spool file not including the halftone mode information into a modified spool file including the halftone mode information when the spool file is judged to include data indicating that an image is to be printed in a reduced area of a print sheet whereby halftone mode is designated; and
maintaining the spool file not including the halftone mode information when the spool file is judged not to include the data indicating that an image is to be printed in a reduced area of a print sheet whereby the halftone mode is not designated, the unmodified spool file being replaced with the modified spool file, in the storage, when the spool file is modified; and
processing the spool file irrespective to whether the spool file is modified or not.

10. The spool file modifying method according to claim 9, further including a step of dividing the spool tile into intermediate files corresponding to print pages,
wherein the step of designating designates the halftone mode for each of the intermediate files by adding designating data which designates the halftone mode to be used to a top of each of the intermediate files.

11. The spool file modifying method according to claim 10, which is capable of modifying either a spool file for a monochromatic image or a spool file for a multi-color image,
wherein the step of designating operates only when the spool file is for printing the monochromatic image.

12. The spool file modifying method according to claim 9, further including a step of dividing the spool file into intermediate files respectively corresponding to print pages,
wherein the step of designating judges whether designating data that designates the processing mode to be used for corresponding intermediate file is included in each of the intermediate files, the step of designating replacing the designating data with predetermined designating data which designates the halftone mode as the processing mode to be used.

13. The spool file modifying method according to claim 12, which is capable of modifying either a spool file for a monochromatic image or a spool file for a multi-color image,
wherein the step of designating operates only when the spool file is for printing the monochromatic image.

14. The spool file modifying method according to claim 9, further including a step of dividing the spool file into intermediate files corresponding to print pages,
wherein the step of designating designates the halftone mode for each of the intermediate files by adding designating data which designates the halftone mode to be used to a top of each of the intermediate files, and
wherein the step of designating judges whether designating data that designates the processing mode to be used for corresponding intermediate file is included in each of the intermediate files, the step of designating replacing the designating data with predetermined designating data which designates the halftone mode as the processing mode to be used.

15. A non-transitory computer readable medium that stores programs to be executed by a computer, the programs representing a spool file modifying method employed in a printing system which generates a spool file for a print job and converts the spool file into print data suitable to a printer to be used, the spool file being stored in a storage, the spool file including intermediate files independent of a type of the printer, the spool file modifying method comprising steps of:
retrieving the spool file from the storage;
judging whether the retrieved spool file includes data indicating that an image is to be printed in a reduced area of a print sheet or not;
if the retrieved spool file does not include halftone mode information, (a) designating a halftone mode as a processing mode to be used when judged that the spool file includes the data indicating that an image is to be printed in a reduced area of a print sheet, and (b) not designating the halftone mode as the processing mode to be used when judged that the spool file does not include the data indicating that the image is to be printed in the reduced area of the print sheet;
modifying the spool file not including the halftone mode information into a modified spool file including the halftone mode information when the spool file is judged to include data indicating that an image is to be printed in a reduced area of a print sheet whereby halftone mode is designated; and
maintaining the spool file not including the halftone mode information when the spool file is judged not to include the data indicating that an image is to be printed in a reduced area of a print sheet whereby the halftone mode is not designated, the unmodified spool file being replaced with the modified spool file, in the storage, when the spool file is modified; and processing the spool file irrespective to whether the spool file is modified or not.

16. The computer readable medium according to claim 15, the method further including a step of dividing the spool file into intermediate files corresponding to print pages, wherein the step of designating designates the halftone mode for each of the intermediate files by adding designating data which designates the halftone mode to be used to a top of each of the intermediate files.

17. The computer readable medium according to claim 16, the method being capable of modifying either a spool file for a monochromatic image or a spool file for a multi-color image, wherein the step of designating operates only when the spool file is for printing the monochromatic image.

18. The computer readable medium according to claim 15, the method further including a step of dividing the spool file into intermediate files respectively corresponding to print pages, wherein the step of designating judges whether designating data that designates the processing mode to be used for corresponding intermediate file is included in each of the intermediate files, the step of designating replacing the designating data with predetermined designating data which designates the halftone mode as the processing mode to be used.

19. The computer readable medium according to claim 18, the method being capable of modifying either a spool file for a monochromatic image or a spool file for a multi-color image, wherein the step of designating operates only when the spool file is for printing the monochromatic image.

20. The computer readable medium according to claim 15, the method further including a step of dividing the spool file into intermediate files corresponding to print pages, wherein the step of designating designates the halftone mode for each of the intermediate files by adding designating data which designates the halftone mode to be used to a top of each of the intermediate files, and wherein the step of designating judges whether designating data that designates the processing mode to be used for corresponding intermediate file is included in each of the intermediate files, the step of designating replacing the designating data with predetermined designating data which designates the halftone mode as the processing mode to be used.

* * * * *